US008982055B2

(12) United States Patent
Strong, IV

(10) Patent No.: US 8,982,055 B2
(45) Date of Patent: Mar. 17, 2015

(54) WIRELESS MOBILE COMMUNICATION TERMINALS AND METHODS FOR FORMING THE SAME

(75) Inventor: Clinton Riley Strong, IV, Apex, NC (US)

(73) Assignees: Sony Corporation, Tokyo (JP); Sony Mobile Communications AB, Lund (SE)

( * ) Notice: Subject to any disclaimer, the term of this patent is extended or adjusted under 35 U.S.C. 154(b) by 1414 days.

(21) Appl. No.: 12/014,168

(22) Filed: Jan. 15, 2008

(65) Prior Publication Data

US 2009/0179862 A1    Jul. 16, 2009

(51) Int. Cl.
G09G 5/00 (2006.01)
G06F 3/02 (2006.01)
G06F 1/16 (2006.01)
G06F 3/044 (2006.01)
H04M 1/22 (2006.01)
H04M 1/23 (2006.01)
H04M 1/02 (2006.01)

(52) U.S. Cl.
CPC ............ *G06F 3/0202* (2013.01); *G06F 1/1616* (2013.01); *G06F 1/1624* (2013.01); *G06F 1/1662* (2013.01); *G06F 3/044* (2013.01); *H04M 1/22* (2013.01); *H04M 1/23* (2013.01); *H04M 1/233* (2013.01); *H01H 2219/03* (2013.01); *H01H 2219/039* (2013.01); *H01H 2219/044* (2013.01); *H01H 2219/062* (2013.01); *H01H 2231/022* (2013.01); *H01H 2239/006* (2013.01); *H04M 1/0214* (2013.01); *H04M 2250/22* (2013.01)
USPC .......................................... 345/169; 345/174

(58) Field of Classification Search
CPC ... G06F 1/1616; G06F 1/1662; G06F 3/0202; G06F 3/044; H01H 2209/00; H01H 2209/014; H01H 2209/016
USPC ........... 345/168–178; 379/365–369; 455/557, 455/575.01–575.06
See application file for complete search history.

(56) References Cited

U.S. PATENT DOCUMENTS 6,069,444 A    5/2000 Krafcik et al.
6,875,938 B2 *  4/2005 Schmiz et al. ................ 200/310
(Continued)

FOREIGN PATENT DOCUMENTS

JP    2003-152853    5/2003
JP    2006-330790    12/2006
(Continued)

OTHER PUBLICATIONS

"Capacitance Sensors For Human Interfaces To Electronic Equipment"—Analog Dialogue 40-10; Oct. 2006; 4 Pages.
(Continued)

*Primary Examiner* — Vijay Shankar
(74) *Attorney, Agent, or Firm* — Myers Bigel Sibley & Sanjovec, P.A.

(57) ABSTRACT

An electronic device includes a user input assembly. The user input assembly includes a capacitive touch sensor unit having a front side, a light guide overlying the front side, an opaque coating on the light guide, and a light source. The opaque coating is configured to represent indicia and/or ornamentation. The light source is operative to generate light that is transmitted through the light guide to illuminate the user input assembly.

24 Claims, 7 Drawing Sheets

(56) References Cited

U.S. PATENT DOCUMENTS

| | | | |
|---|---|---|---|
| 6,912,280 | B2 | 6/2005 | Henry |
| 2004/0108193 | A1 | 6/2004 | Schmiz et al. |
| 2006/0262072 | A1 | 11/2006 | Murakami et al. |
| 2007/0296702 | A1* | 12/2007 | Strawn et al. ............ 345/169 |
| 2008/0122945 | A1* | 5/2008 | Ahonen ................. 348/223.1 |
| 2008/0266273 | A1* | 10/2008 | Slobodin et al. .......... 345/174 |
| 2009/0046072 | A1* | 2/2009 | Emig et al. ............... 345/173 |

FOREIGN PATENT DOCUMENTS

| | | |
|---|---|---|
| JP | 2008-139961 | 6/2008 |
| WO | WO 01/48771 A1 | 7/2001 |
| WO | WO2007/083591 A1 | 7/2007 |

OTHER PUBLICATIONS

"Add Capacitive Sensing To A Digital Handset"—CommsDesign; Andrew Page; Aug. 29, 2005; 4 Pages.

"Comparison Of Resistive And Capacitive Technologies",Synaptics 4 pages (believed prior to Dec. 14, 2007) <http://en.wikipedia.org/wiki/DVB-H>.

Notification of Transmittal of the International Search Report and Written Opinion of the International Searching Authority mailed May 31, 2010 for corresponding PCT application No. PCT/US2008/009049.

"Capacitive Position Sensing"—Synaptics Technologies; 1 Page "Admitted prior art".

"Touchpad" 3 pages http://en.wikipedia.org/wiki/Touchpad "Admitted prior art".

"Capacitive Keyboard" 1 page http://www.jarvin.com/hardware/CapacitiveKeyboard.html "Admitted prior art".

Japanese Office Action for Application No. JP2010-542203, mailed on Jun. 22, 2012.

"Capacitive Position Sensing"—Synaptics Technologies; 1 Page "Admitted prior art", Available on Dec. 4, 2007.

"Touchpad" 3 pages http://en.wikipedia.org/wiki/Touchpad "Admitted prior art", Available on Dec. 4, 2007.

"Capacitive Keyboard" 1 page http://www.jarvin.com/hardware/CapacitiveKeyboard.html "Admitted prior art", Available on Nov. 30, 2007.

\* cited by examiner

WIRELESS MOBILE COMMUNICATION TERMINALS AND METHODS FOR FORMING THE SAME

FIELD OF THE INVENTION

The present invention relates to electronic devices and, more particularly, to electronic devices such as wireless mobile communication terminals and methods for forming the same.

BACKGROUND OF THE INVENTION

Many mobile wireless communication devices such as cellular telephones provide man-machine interfaces that include a keypad, such as a traditional telephone keypad, and various navigational keys and/or soft keys. Conventional keypads commonly in use include a printed circuit board, metal dome contacts, and a silicone keypad with dome actuation features. It is often desirable to reduce or minimize the thickness of a keypad in an electronic device and conventional keypads as described may be undesirably thick.

SUMMARY OF THE INVENTION

According to embodiments of the present invention, an electronic device includes a user input assembly. The user input assembly includes a capacitive touch sensor unit having a front side, a light guide overlying the front side, an opaque coating on the light guide, and a light source. The opaque coating is configured to represent indicia and/or ornamentation. The light source is operative to generate light that is transmitted through the light guide to illuminate the user input assembly.

According to some embodiments, the opaque coating is disposed on a side of the light guide opposite the capacitive touch sensor unit and is backlit by the light from the light source.

According to some embodiments, the indicia includes keypad indicia visually representing a keypad, and the capacitive touch sensor unit is configured to receive keypad input from an operator in correspondence with the keypad indicia.

According to some embodiments, the indicia includes navigation key indicia visually representing at least one navigation input device, and the capacitive touch sensor unit is configured to receive navigation input from an operator in correspondence with the navigation key indicia.

The light source may include a light emitting diode (LED). In some embodiments, the LED is oriented to project light sidewardly with respect to a front surface of the capacitive touch sensor unit and into the light guide.

The light guide may be disposed directly on and in contact with a front surface of the capacitive touch sensor unit. In some embodiments, the light guide is adhered directly on and in contact with the front surface of the capacitive touch sensor unit.

According to some embodiments, the light guide has a thickness in the range of from about 0.3 to 0.5 mm. According to some embodiments, the light guide is formed of at least one of acrylic (PMMA), polycarbonate (PC), and silicone rubber.

According to some embodiments, the opaque coating has a thickness in the range of from about 0.001 to 0.01 mm. According to some embodiments, the opaque coating is formed of at least one of polyurethane, aluminum and stainless steel.

The capacitive touch sensor unit may include a printed circuit board (PCB) or a printed wiring board (PWB), the PCB or PWB including a rigid substrate and an electrical circuit trace on the substrate.

The capacitive touch sensor unit may include a flexible printed circuit (FPC), the FPC including a flexible substrate and an electrical circuit trace on the substrate.

According to some embodiments, the device is a wireless communication terminal. According to some embodiments, the device is a handheld mobile wireless communication terminal. According to some embodiments, the device is a cellular telephone.

According to embodiments of the present invention, a method for forming an electronic device includes assembling a user input assembly, which includes: mounting a light guide over a front side of a capacitive touch sensor unit; selectively applying an opaque coating onto the light guide such that the opaque coating is configured to represent indicia and/or ornamentation; and providing a light source to generate light that is transmitted through the light guide to illuminate the user input assembly.

According to some embodiments, the step of selectively applying the opaque coating onto the light guide includes painting the opaque coating onto the light guide.

According to some embodiments, the step of selectively applying the opaque coating onto the light guide includes printing the opaque coating onto the light guide.

According to some embodiments, the step of selectively applying the opaque coating onto the light guide includes vacuum coating the opaque coating onto the light guide.

Further features, advantages and details of the present invention will be appreciated by those of ordinary skill in the art from a reading of the figures and the detailed description of the preferred embodiments that follow, such description being merely illustrative of the present invention.

DETAILED DESCRIPTION OF EMBODIMENTS OF THE INVENTION

Figure 1:
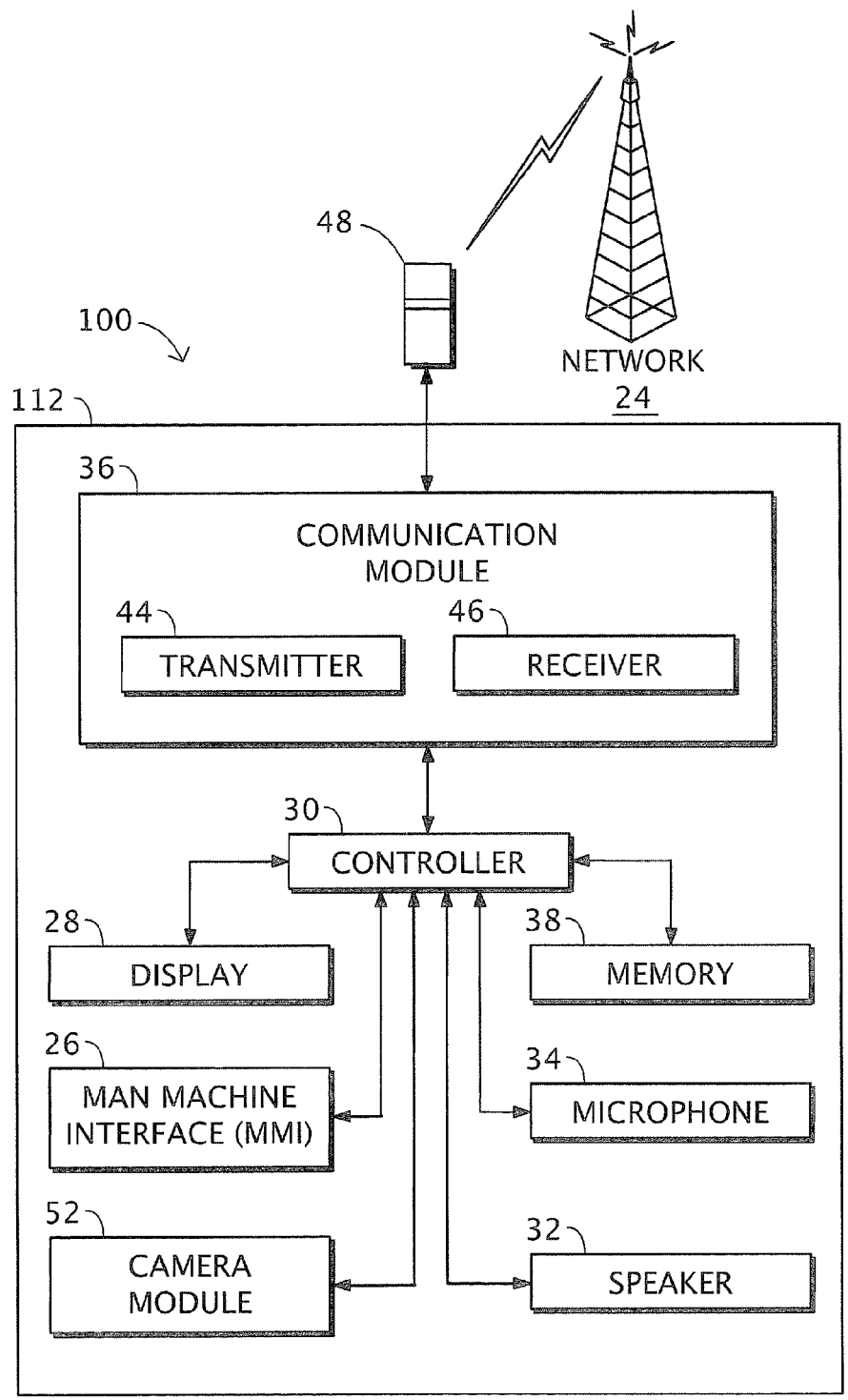
FIG. 1 is a schematic diagram of a mobile wireless communication terminal according to embodiments of the present invention and an exemplary wireless communications network.

The present invention now will be described more fully with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. Like numbers refer to like elements throughout.

As used herein, the term "comprising" or "comprises" is open-ended, and includes one or more stated features, integers, elements, steps, components or functions but does not preclude the presence or addition of one or more other features, integers, elements, steps, components, functions or groups thereof.

As used herein, the term "and/or" includes any and all combinations of one or more of the associated listed items.

As used herein, the common abbreviation "e.g.", which derives from the Latin phrase "exempli gratia," may be used to introduce or specify a general example or examples of a previously mentioned item, and is not intended to be limiting of such item. If used herein, the common abbreviation "i.e.", which derives from the Latin phrase "id est," may be used to specify a particular item from a more general recitation.

The terminology used herein is for the purpose of describing particular embodiments only and is not intended to be limiting of the invention. As used herein, the singular forms "a", "an" and "the" are intended to include the plural forms as well, unless the context clearly indicates otherwise.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In addition, spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly.

It will be understood that when an element is referred to as being "coupled" or "connected" to another element, it can be directly coupled or connected to the other element or intervening elements may also be present. In contrast, when an element is referred to as being "directly coupled" or "directly connected" to another element, there are no intervening elements present. Furthermore, "coupled" or "connected" as used herein may include wirelessly coupled or connected.

As used herein, "electronic component" means an active device as contrasted with a passive electrical connector or the like. An electronic component may include a processor.

As used herein, a "communication terminal" includes, but is not limited to, a terminal that is configured to receive/transmit communication signals via a wireline connection, such as via a public-switched telephone network (PSTN), digital subscriber line (DSL), digital cable, or another data connection/network, and/or via a wireless interface with, for example, a cellular network, a satellite network, a wireless local area network (WLAN), and/or another communication terminal.

When the communication terminal is configured to communicate over a wireless interface, it is referred to herein as a "wireless communication terminal" or a "wireless terminal." Examples of wireless terminals include, but are not limited to, a cellular telephone, personal data assistant (PDA), pager, and/or a computer that is configured to communicate data over a wireless communication interface that can include a cellular telephone interface, a Bluetooth interface, a wireless local area network interface (e.g., 802.11), another RF communication interface, and/or an optical/infra-red communication interface.

As used herein, "mobile terminals" may be portable, transportable, installed in a vehicle (aeronautical, maritime, or land-based), or situated and/or configured to operate locally and/or in a distributed fashion at any other location(s) on earth and/or in space.

The present invention is described below with reference to schematic and block diagrams of electronic devices including touch screens according to some embodiments of the present invention. Although the electronic devices are discussed herein as being included as part of a mobile wireless communication terminal, for example, the mobile terminal 100 of FIGS. 1-6, embodiments of the present invention are not limited to this configuration. As discussed below, various aspects of the present invention may be incorporated into other types of devices including, for example, mobile devices that are not wireless communication terminals or non-portable electronic devices, without departing from the scope of the present invention.

Embodiments of the present invention will now be described below with respect to FIGS. 1-6. Embodiments of the present invention provide a mobile wireless communication terminal 100 including a user input assembly 140. The user input assembly 140 may serve as a keypad or other user input device for the terminal 100. The user input assembly 140 may advantageously be provided in a relatively thin form factor.

Referring now to FIG. 1, an exemplary radiotelephone communication system in accordance with embodiments of the present invention is illustrated, which includes the mobile wireless communication terminal 100 and a base station transceiver, which is part of a wireless communications network 24. In some embodiments of the present invention, the network 24 includes a base station transceiver that includes the radio transceiver(s) that define an individual cell in a cellular network and communicates with the mobile terminal 100 and other mobile terminals in the cell using a radio-link protocol. It will be understood that, in some embodiments of the present invention, many base station transceivers may be connected through, for example, a mobile switching center and other devices to define a wireless communications network.

The mobile terminal 100 includes a portable housing 112 and a man machine interface (MMI) 26, as described in more detail below. The mobile terminal 100 also includes a display device or unit 28, a speaker 32, a microphone 34, a transceiver or communication module 36, and a memory 38 including application information and parameters, any of which may communicate with a processor or controller 30. Furthermore, the mobile terminal 100 according to embodiments of the present invention may further include a digital camera module 52, which also communicates with the controller 30. Other user interface devices may be provided such as other suitable input device(s).

The speaker 32 generates sound responsive to an input audio signal. The microphone 34 is coupled to an audio processor that is configured to generate an audio data stream responsive to sound incident on the microphone. The display device 28 may include, for example, a liquid crystal display (LCD) module.

The communication module 36 can include a cellular communication module, a direct point-to-point connection module, and/or a WLAN module. With a cellular communication module, the wireless terminal 100 can communicate via the base station(s) of the network using one or more cellular communication protocols such as, for example, Advanced Mobile Phone Service (AMPS), ANSI-136, Global Standard for Mobile (GSM) communication, General Packet Radio Service (GPRS), enhanced data rates for GSM evolution (EDGE), code division multiple access (CDMA), wideband-CDMA, CDMA2000, and Universal Mobile Telecommunications System (UMTS). The cellular base stations may be connected to a Mobile Telephone Switching Office (MTSO) wireless network, which, in turn, can be connected to a PSTN and/or another network.

The communication module 36 may include a transceiver typically having a transmitter circuit 44 and a receiver circuit 46, which respectively transmit outgoing radio frequency signals (e.g., to the network 24, a router or directly to another terminal) and receive incoming radio frequency signals (e.g., from the network 24, a router or directly from another terminal), such as voice and data signals, via an antenna 48. The communication module 36 may include a short-range transmitter and receiver, such as a Bluetooth transmitter and receiver. The antenna 48 may be an embedded antenna, a retractable antenna or any antenna known to those having skill in the art without departing from the scope of the present invention. The radio frequency signals transmitted between the mobile terminal 100 and the network 24 may include both traffic and control signals (e.g., paging signals/messages for incoming calls), which are used to establish and maintain communication with another party or destination. The radio frequency signals may also include packet data information, such as, for example, cellular digital packet data (CDPD) information. In addition, the transceiver may include an infrared (IR) transceiver configured to transmit/receive infrared signals to/from other electronic devices via an IR port.

The controller 30 may support various functions of the mobile terminal 100, including processing and executing commands entered by an operator using the user input assembly 140. The controller 30 can be any commercially available or custom microprocessor, for example. In use, the controller 30 of the mobile terminal 100 generates a display image on the display device 28.

The foregoing components of the mobile terminal 100, with the exception of the user input assembly 140, may be included in many conventional mobile terminals and their functionality is generally known to those skilled in the art. As used herein, the term "portable electronic device" or "mobile terminal" may include: a cellular radiotelephone with or without a multi-line display; a Personal Communications System (PCS) terminal that may combine a cellular radiotelephone with data processing, facsimile and data communications capabilities; a Personal Data Assistant (PDA) that can include a radiotelephone, pager, Internet/intranet access, Web browser, organizer, calendar and/or a global positioning system (GPS) receiver; a gaming device, an audio video player, and a conventional laptop and/or palmtop portable computer that may include a radiotelephone transceiver.

Figure 2:
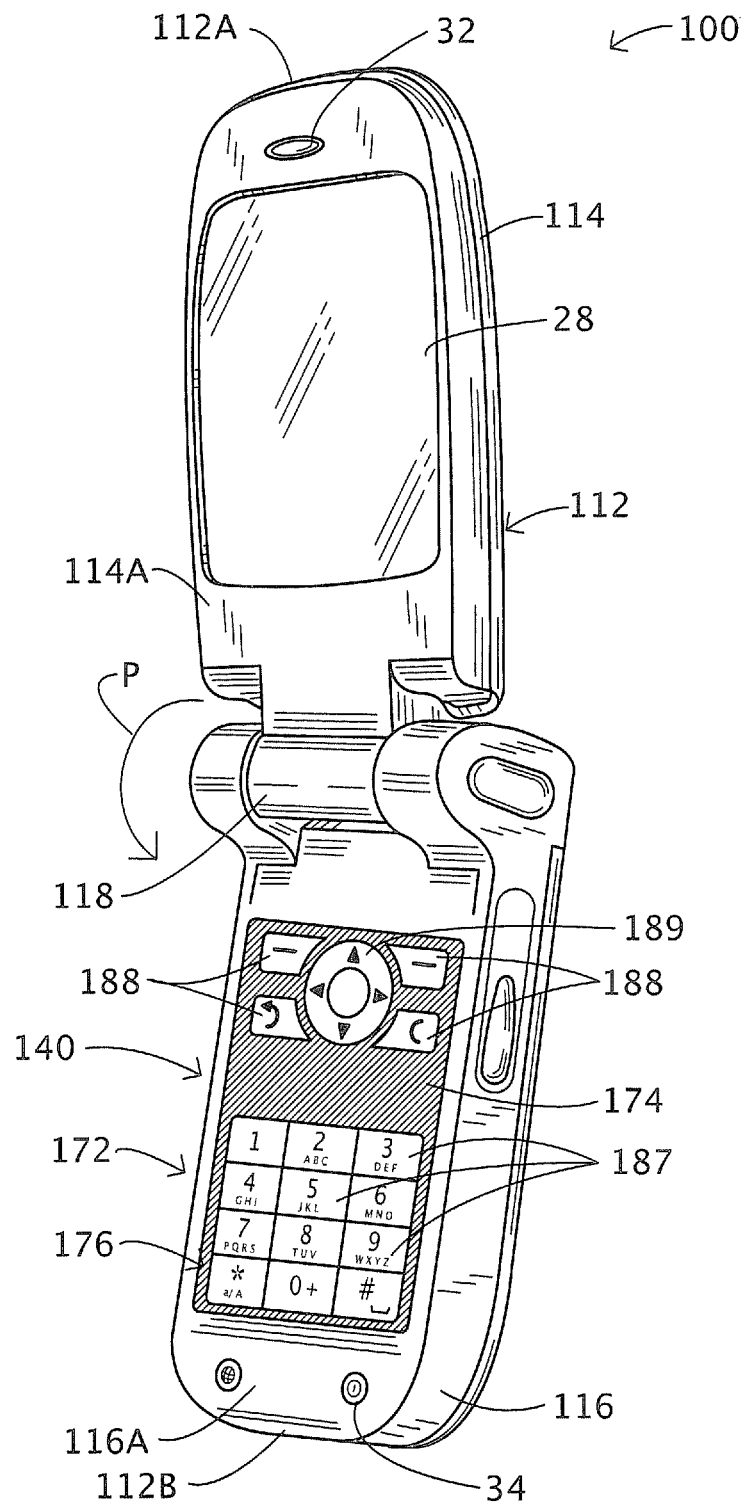
FIG. 2 is a perspective view of the mobile terminal of FIG. 1.
Figure 3:
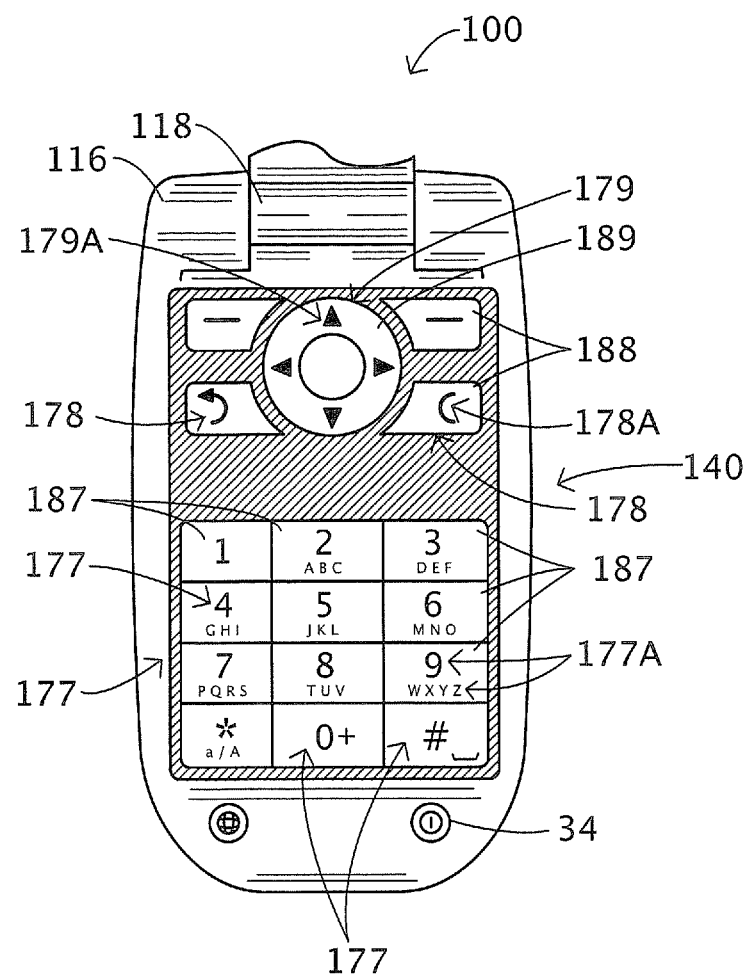
FIG. 3 is an enlarged, fragmentary, front plan view of the mobile terminal of FIG. 1.

According to some embodiments and as illustrated in FIG. 2, the mobile terminal 100 is a handheld (portable) mobile terminal. By "handheld mobile terminal," it is meant that the outer dimensions of the mobile terminal are adapted and suitable for use by a typical operator using one hand. According to some embodiments, the total volume of the handheld mobile terminal is less than about 200 cc. According to some embodiments, the total volume of the handheld terminal is less than about 100 cc. According to some embodiments, the total volume of the handheld mobile terminal is between about 50 and 100 cc. According to some embodiments, no dimension of the handheld mobile terminal 100 exceeds about 200 mm.

The housing 112 may be formed of a polymeric material, such as polystyrene. Alternatively or additionally, the housing 112 may be formed of any other suitable material, such as metal. The housing 112 may be molded and may be assembled from multiple parts. The housing 112 has opposing top and bottom ends 112A and 112B and includes an upper or top subhousing or housing portion 114 and a lower or bottom subhousing or housing portion 116. As used herein, "top," "bottom," "upper" and "lower" refer to the relative general positions of the components or features when the mobile terminal 100 is in its open position and held in the typical, generally upright orientation for usage. The upper housing portion 114 is pivotally coupled to the lower housing portion 116 by a hinge mechanism 118 to form a clamshell housing assembly. The housing portions 114, 116 can be pivoted about a transverse axis of the hinge mechanism 118 between an open or deployed position, as shown in FIG. 2, and a stored or closed position wherein the housing portion 114 overlies (i.e., is folded in a direction P over and onto) the housing portion 116. Handheld wireless communication terminals having clamshell housings as shown are commonly referred to as "flip phones." The housing portions 114, 116 have respective front walls 114A, 116A defining their front sides. An opening 116B is defined in the front wall 116A. The user input assembly 140 is disposed in and accessible through the opening 116B. One or both of the housing portions 114, 116 define an interior cavity (not shown) that contains various components of the mobile terminal 100, including the controller 30. The display 28 is mounted in the front wall 114A of the upper housing portion 114.

The MMI 26 includes the user input assembly 140. The user input assembly 140 includes a capacitive touch sensor unit 150, a light guide 160, an opaque coating 170, and light sources 142. The thicknesses of the capacitive touch sensor unit 150, the light guide 160 and the opaque coating are exaggerated in FIGS. 4 and 6 for the purpose of explanation. The MMI 26 may further include any other suitable input device(s) including, for example, a joystick, a keyboard/keypad, a dial, a directional key or keys, and/or a pointing device (such as a mouse, trackball, touch pad, etc.).

The capacitive touch sensor unit 150 is a capacitive touch sensor device or pad. Any suitable capacitive touch sensor device or pad may be used. Such devices are known to those of skill in the art and therefore will not be described herein in detail. According to some embodiments, the capacitive touch sensor unit 150 has a front side 151 and includes a substrate 152 having a top or front surface 153 and one or more electrically conductive traces 156 having portions disposed on the surface 153. The substrate 152 may be generally planar. According to some embodiments, the substrate 152 is a printed circuit board (PCB), a printed wiring board (PWB), or a flexible printed circuit (FPC). The substrate 152 may include multiple layers and portions of the trace 156 may be interposed between layers.

The substrate 152 may be formed of any suitable material. According to some embodiments, the substrate 152 is a PCB or PWB substrate formed of a prepreg (preimpregnated material) such as cotton paper or glass fiber (woven or matte) in combination with epoxy. According to some embodiments, the substrate 152 is a FPC formed of a polyamide or polyester film.

According to some embodiments, the capacitive touch sensor unit 150 has a thickness T1 (FIG. 6) in the range of from about 0.1 to 1.0 mm.

The trace 156 may be comprised of one continuous trace or a set including a plurality of discrete traces. The trace or traces 156 will be described hereinafter as a trace 156; however, it will be appreciated that this description will apply whether the trace 156 is one or a set of multiple traces. The trace 156 may be formed of any suitable material. According to some embodiments, the trace 156 is formed of copper or gold. The trace 156 may be printed on the substrate 152.

Figure 4:
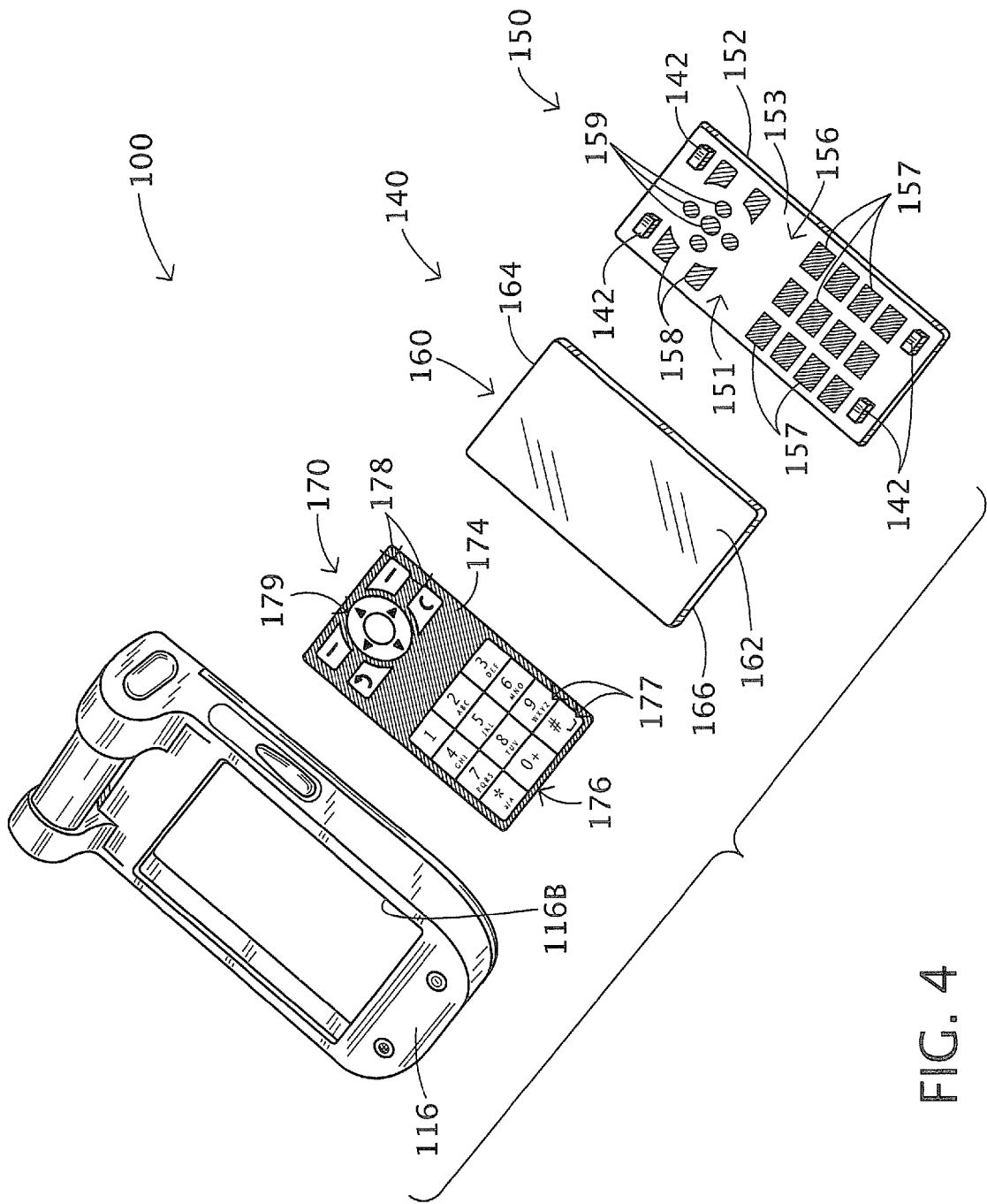
FIG. 4 is an exploded, fragmentary, perspective view of the mobile terminal of FIG. 1.
Figure 5:
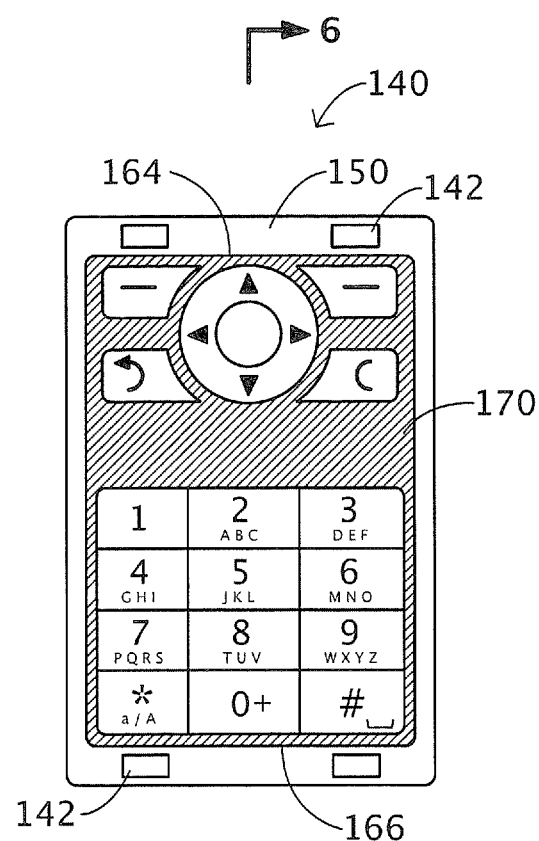
FIG. 5 is a front plan view of a capacitive touch sensor unit forming a part of the mobile terminal of FIG. 1.
Figure 6:
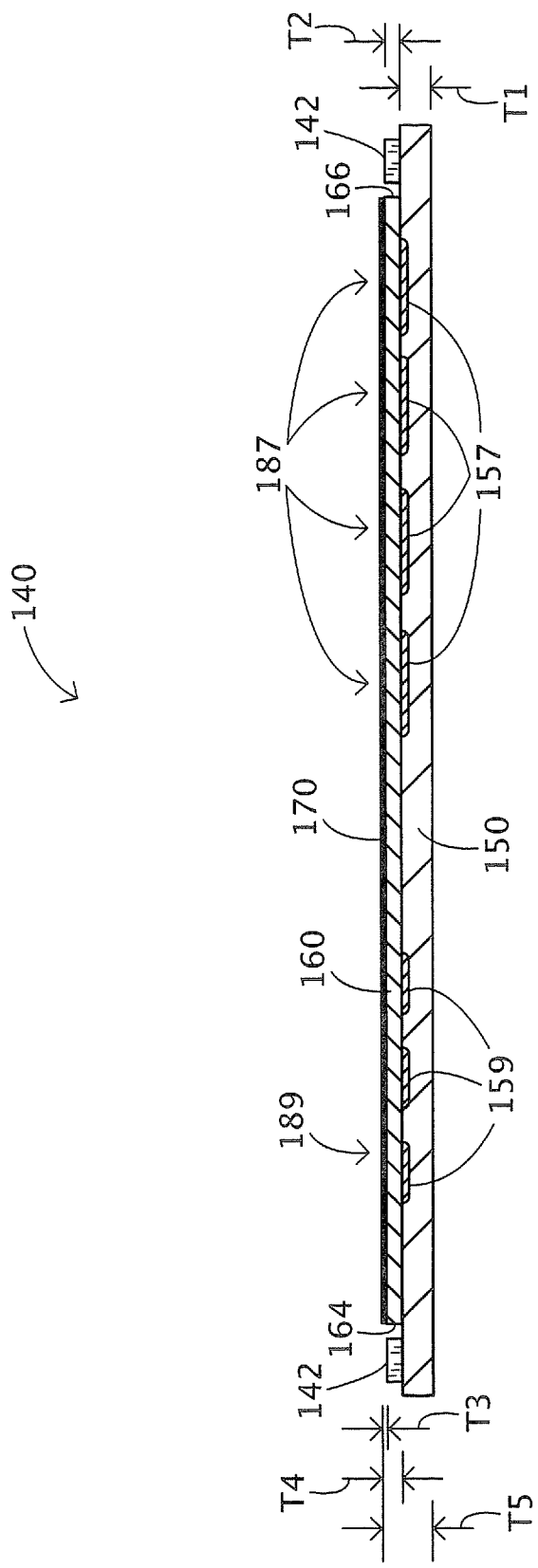
FIG. 6 is a cross-sectional view of the capacitive touch sensor unit of FIG. 5 taken along the line 6-6 of FIG. 5.

With reference to FIGS. 4 and 6, a capacitive touch sensor unit 150 including an exemplary PCB 152 and trace 156 is shown therein. The trace 156 includes capacitive contacts or pads 157, 158, 159 on the front surface 153 of the substrate 152. The contacts 157, 158, 159 are electrically connected to a driver circuit or processor (as discussed below) by connector trace portions or segments. In the illustrated embodiment, the connector trace segments are not visible, but rather are disposed on a sublayer and connected to the contacts 157, 158, 159 by vias. The contacts 157, 158, 159 are disposed on the front surface 153 and may be covered by a solder mask (e.g., a lacquer coating) to protect against oxidation or damage. According to some embodiments, the solder mask on the front surface 153 has a thickness of no more than about 0.02 mm. According to alternative embodiments, a further PCB dielectric layer may be laminated over the front surface 153 and the contacts 157, 158, 159. Where an FPC is used for the substrate 152, the FPC may be coated with a solder mask or a cover layer of polyimide (PI) or polyester (PET).

The light sources 142 may be securely mounted on the substrate 152. According to some embodiments, the light sources 142 are light emitting diodes (LEDs). According to some embodiments, the light sources 142 are LEDs configured and mounted to be side-firing (i.e., to primarily direct generated light along a plane substantially parallel to the plane of the substrate front surface 153).

The light guide 160 overlies the front side 151 and front surface 153 of the capacitive touch sensor unit 150. The light guide 160 has a front surface 162, an upper edge 164 and a lower edge 166. The light guide 160 overlies the trace 156. According to some embodiments, the trace 156 is sandwiched between the substrate 152 and the light guide 160. According to some embodiments, the light guide 160 directly overlies and engages the trace 156 (or the solder mask coating protecting the trace 156) so that there are no intervening layers. However, according to other embodiments, a further layer or panel may be provided between the trace 156 and the lower surface of the light guide 160.

The light guide 160 can be secured to the substrate 152 by any suitable means. According to some embodiments, the light guide 160 is bonded to the substrate 152 by an adhesive layer. According to some embodiments, the light guide 160 is mechanically secured to the substrate 152 by suitable fasteners or features. According to some embodiments, the light guide 160 is laminated or bonded to the substrate 152 by heat lamination.

The light guide 160 is formed of a light transmissive material. The light guide 160 may be transparent or semi-transparent (translucent). The light guide 160 may be formed of any suitable light transmissive material. According to some embodiments, the light guide 160 is formed of acrylic (PMMA), polycarbonate (PC) or silicone rubber.

According to some embodiments, the light guide 160 has a thickness T2 (FIG. 6) in the range of from about 0.3 to 0.5 mm.

The opaque coating 170 overlies and is bonded to the top surface 162 of the light guide 160. According to some embodiments, the opaque coating 170 directly overlies and engages the light guide 160 so that there are no intervening layers. However, according to other embodiments, a layer or coating may be provided between the light guide 160 and the lower surface of the opaque coating 170. The coating 170 may be applied to the front surface 162 by any suitable method. According to some embodiments, the coating 170 is applied to the front surface 162 by painting, vacuum coating, or ink printing. According to some embodiments, the coating 170 is applied to the front surface 162 by vacuum metallization or screen printing.

The opaque coating 170 is formed of a light blocking (i.e., light absorbing and/or reflecting) material. The opaque coating 170 may be formed of any suitable light blocking material. According to some embodiments, the opaque coating 170 is formed of polyurethane, aluminum or stainless steel.

According to some embodiments, the opaque coating 170 has a thickness T3 (FIG. 6) in the range of from about 0.001 to 0.01 mm.

The coating 170 is selectively patterned to present prescribed visual indicia and/or ornamentation. In the illustrated embodiment, the coating 170 presents a user interface pattern 172 including a decorative border 174, keypad indicia 176, auxiliary key indicia 178, and rocker key indicia 179. The coating of the keypad indicia 176 includes a plurality of keypad key indicia 177 and keypad key label indicia 177A. The coating portions of the auxiliary key indicia 178 and the rocker key indicia 179 include label indicia 178A and 179A, respectively. The key indicia 177, 178 and 179 overlie corresponding portions of the capacitive touch sensor unit 150. More particularly, the key indicia 177, 178, 179 overlie, in registry, respective portions of the trace 156. The key indicia 177, 178, 179 each overlie a respective one of the capacitive contacts 157, 158, 159. Each key indicia 177, 178, 179 and its associated capacitive contact 157, 158, 159 in combination form a respective key 187, 188, 189.

The capacitive touch sensor unit 150 is adapted to be touched by a suitable member such as an operator's finger (which may include the operator's thumb). The terminal 100 may include a controller card including a capacitive driver circuit (to which the capacitive contacts 157, 158, 159 are electrically routed by the trace connector segments) to drive the capacitive touch sensor unit 150 and convert touches into designated input signals, a software driver program that communicates between the controller card and the operating system of the computer of the electronic device 100 (e.g., on a main PCB of the device 100), and a software application adapted to enable, monitor and process signals from the capacitive touch sensor unit 150. When a user's finger is placed on or proximate a position on the capacitive touch sensor unit 150, the apparent capacitance of a circuit including the trace 156 is changed and the controller card, software and/or other device(s) determine the position corresponding to the change in capacitance.

The capacitive touch sensor unit 150 utilizes the conductivity of a user's finger to shunt or transfer some of the charge or field that is present at or near the surface of the capacitive touch sensor unit 150 to the user's body. This results in a decrease in the charge in the capacitive layer or surface of the capacitive touch sensor unit 150, which is measured (e.g., by a circuit or circuits connected to the trace 156). The relative charges are calculated by the processor, which indicates where the touch occurred on the capacitive touch sensor unit 150. This information is then relayed to the capacitive touch sensor unit 150 driver software.

Known and suitable capacitive touch sensors operate on various different principles that may be suitable. For example, in one type of capacitive touch sensor, two sets of traces are provided on two respective layers separated by an insulator. A high frequency signal is applied sequentially between pairs of the traces on the two layers. The current that passes between the traces at a given location is proportional to the capacitance at that location. When a finger (or other grounded object) is placed over a selected location (e.g., a capacitive contact 157, 158, 159), some of the electric field lines are shunted to the finger (which serves as a ground point), thereby changing the apparent capacitance at that location.

According to another principle, an electric field is generated by a transmitter to a receiver on opposite sides of the touch sensor. When a finger (or other grounded object) is placed in proximity to the trace 156 (e.g., over a capacitive contact 157, 158, 159), some of the electric field lines are shunted to ground and do not reach the receiver. The capacitance measured at the receiver is thereby reduced and this reduction is detected and processed by the controller.

While the light guide 160 has been described as a separate component from the capacitive touch sensor unit 150, the light guide 160 may perform as an electrical and/or mechanical component of the capacitive touch sensor. According to some embodiments, the light guide 160, the coating 170 and, optionally, the aforementioned thin solder mask are the only insulator layers between the capacitive contacts 157, 158, 159 and the user's finger. The light guide 160 may serve as mechanical shield or barrier between the capacitive contacts 157, 158, 159 and the user's finger. According to some embodiments, the light guide 160 and the coating 170 are the only mechanical barrier layers between the trace 156 and the user's finger.

In use, a user utilizes the input assembly 140 to enter commands and data into the terminal 100. More particularly, the user may refer to the visual indicia provided by the coating 170 to identify the locations of the key indicia 177, 178, 179 and thereby the locations of the keys 187, 188, 189 and their corresponding associated functions. The user touches the keys 187, 188, 189 as desired. That is, the user touches the front of the light guide 160 in the zones of the key indicia 177, 178, 179 to thereby activate the capacitive touch sensor unit 150 to detect, register and communicate the touches proximate the capacitive contacts 157, 158, 159 to the controller 30. The controller may in turn register a corresponding command. In this manner, the user input assembly 140 may be used to emulate a conventional mechanical keypad or the like.

The light sources 142 generate and direct light into the adjacent edges 164, 166 of the light guide 160 to illuminate the user input assembly 140. The generated light is transmitted through the light guide 160 to backlight the key indicia 177, 178, 179, in effect providing backlit keys 187, 188, 189. The opaque coating 170 blocks stray light so that the light passes through the voids in the key indicia 177, 178, 179 to the viewer.

The terminal 100 and the user input assembly 140 may provide a number of advantages over conventional input devices. The input assembly 140 may be formed to have a relatively small thickness, particularly as compared to a metal dome contact-type keypad. Notwithstanding this low thickness, the input assembly 140 provides distributed backlighting as well as desired indicia for the user. The opaque coating 170 provides multiple functions, including displaying operational indicia (such as text and graphics), blocking stray light, and decorating the surface of the user input assembly 140. Because a capacitive touch sensor unit is employed, no mechanical movement is required.

According to some embodiments, the light guide 160 and the coating 170 have a combined thickness T4 (FIG. 6) of no more than about 0.51 mm. According to some embodiments, the light guide 160 and the coating 170 have a combined thickness T4 of between about 0.30 and 0.51 mm.

According to some embodiments, the capacitive touch sensor unit 150, the light guide 160 and the coating 170 have a combined thickness T5 (FIG. 6) of no more than about 1.5 mm. According to some embodiments, the capacitive touch sensor unit 150, the light guide 160 and the coating 170 have a combined thickness T5 of between about 0.40 and 1.5 mm.

According to some embodiments, the keypad indicia 176 represents a numeric keypad and the corresponding keys 187 operate as a numeric keypad. According to some embodiments, the key indicia 177 and keys 187 are arranged in sequential order according to their assigned primary characters. According to some embodiments and as illustrated, the keypad is a numeric keypad having a traditional telephone keypad layout or configuration (referring to the primary designations 177A of the key indicia 177). The keypad may have a nine-digit or, as shown, twelve-digit telephone keypad layout. According to some embodiments, the keypad complies with at least one of the following standards applicable to multi-function keypads for radiotelephone: International standard ITU E.161 (also known as ANSI T1.703-1995/1999) and/or ISO/IEC 9995-8:1994. According to further embodiments, other types or configurations of keypads may be provided, such as an alphanumeric (e.g., QWERTY) keypad.

Some or all of the keys 187 are multifunction input keys bearing corresponding multi-function label indicia 177A. The keys 187 are primarily labeled with indicia 177A of numerals "0" to "9", and symbols "*" and "#". The keys 187 are secondarily labeled with indicia 177A of letters "A" to "Z", symbol "+", and case shift "a/A". Some of the keys 187 bear secondary labels for multiple letters. Each key 187 is enabled to input the characters or commands indicated thereon to the controller 30 when properly actuated by the user. Each key 187 bearing multiple indicia may be used to alternatively input each of the indicated characters or commands depending on the operational mode, selected input field, and operation by the user.

The rocker key 189 and/or the auxiliary keys 188 may serve as navigational input keys for moving about and selecting between screens, menus, modes, and the like. The rocker key 189 and the auxiliary keys 188 may be labeled with suitable indicia 178A, 179A corresponding to their input command functions. The rocker key 189 and/or the auxiliary keys 188 may be soft keys, the function of which will be labeled or indicated on the display 28 in accordance with the current operational mode, selected menu or the like.

Figure 7:
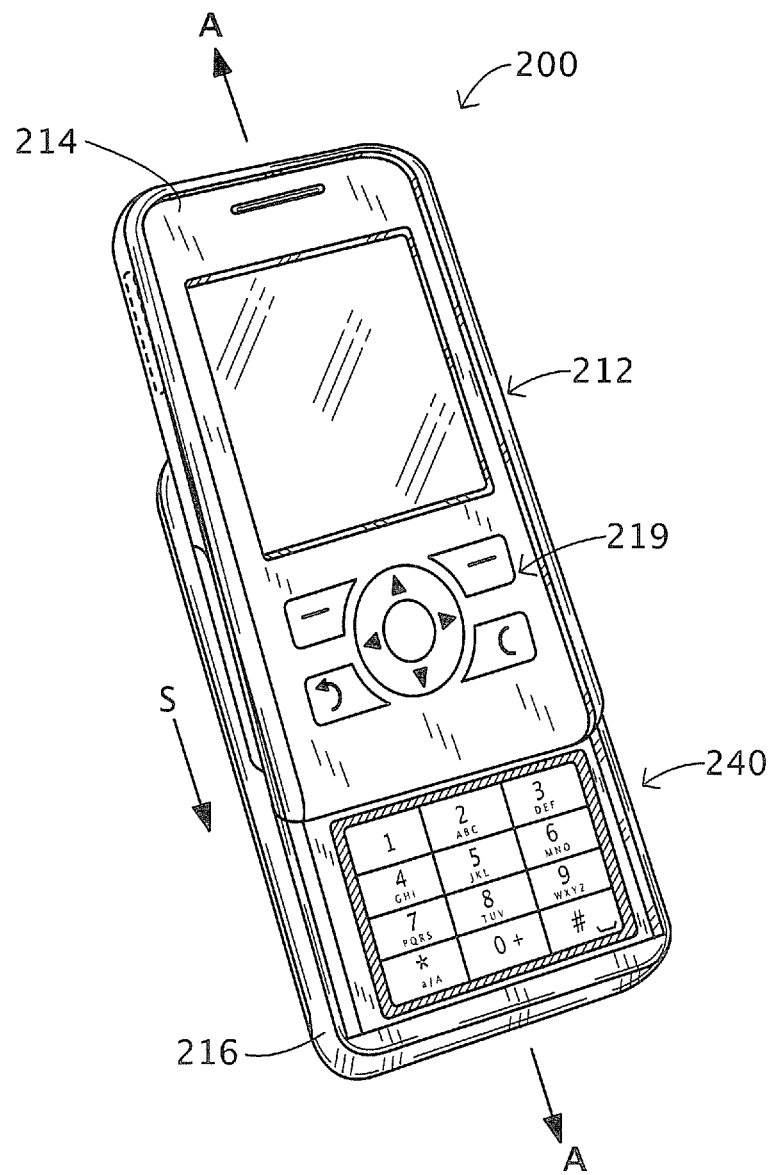
FIG. 7 is a perspective view of a mobile wireless communication terminal according to further embodiments of the present invention.

With reference to FIG. 7, a mobile wireless communication terminal 200 according to further embodiments of the present invention is shown therein. The mobile terminal 200 corresponds to the mobile terminal 100 except that the mobile terminal 200 is of a configuration commonly referred to as a "slider phone." The housing 212 includes an upper housing portion 214 that is slidably mounted on a lower housing portion 216 such that the upper housing portion 214 can be slid on the housing portion 216 along a slide axis A-A between an open or deployed position as shown in FIG. 7 and a closed or stored position wherein the upper housing portion 214 overlies (i.e., is slid in a direction S onto and over) the lower housing portion 216. The mobile terminal 200 includes a user input assembly 240 corresponding to the user input assembly 140 except that the user input assembly 240 does not include keys corresponding to the keys 188, 189. In the terminal 200, conventional mechanical navigation keys 219 are provided in place of the capacitive touch sensor keys 188, 189. The navigation keys 219 may, however, likewise be replaced with a user input assembly constructed and operable as described herein with regard to the user input assembly 140.

According to further embodiments, a mobile wireless communication terminal may be formed and configured as described above but with a housing that is of a "one-piece" construction (i.e., does not have relatively movable housing portions).

Many alterations and modifications may be made by those having ordinary skill in the art, given the benefit of present disclosure, without departing from the spirit and scope of the invention. Therefore, it must be understood that the illustrated embodiments have been set forth only for the purposes of example, and that it should not be taken as limiting the invention as defined by the following claims. The following claims, therefore, are to be read to include not only the combination of elements which are literally set forth but all equivalent elements for performing substantially the same function in substantially the same way to obtain substantially the same result. The claims are thus to be understood to include what is specifically illustrated and described above, what is conceptually equivalent, and also what incorporates the essential idea of the invention.

What is claimed is:

1. An electronic device comprising a user input assembly, the user input assembly including:
   a capacitive touch sensor unit having a front side;
   a light guide overlying the front side;
   an opaque coating formed of a light blocking material on the light guide, wherein the opaque coating is configured to represent indicia and/or ornamentation; and
   a light source to generate light that is transmitted through the light guide to illuminate the user input assembly.

2. The device of claim 1 wherein the opaque coating is disposed on a side of the light guide opposite the capacitive touch sensor unit and is backlit by the light from the light source.

3. The device of claim 1 wherein the light source includes a light emitting diode (LED).

4. The device of claim 3 wherein the LED is oriented to project light sidewardly with respect to a front surface of the capacitive touch sensor unit and into the light guide.

5. The device of claim 1 wherein the light guide is disposed directly on and in contact with a front surface of the capacitive touch sensor unit.

6. The device of claim 5 wherein the light guide is adhered directly on and in contact with the front surface of the capacitive touch sensor unit.

7. The device of claim 1 wherein the light guide has a thickness in the range of from about 0.3 to 0.5 mm.

8. The device of claim 1 wherein the light guide is formed of at least one of acrylic, polycarbonate, and silicone rubber.

9. The device of claim 1 wherein the opaque coating has a thickness in the range of from about 0.001 to 0.01 mm.

10. The device of claim 1 wherein the opaque coating is formed of at least one of polyurethane, aluminum, and stainless steel.

11. The device of claim 1 wherein the capacitive touch sensor unit includes a printed circuit board (PCB) or a printed wiring board (PWB), the PCB or PWB including a rigid substrate and an electrical circuit trace on the substrate.

12. The device of claim 1 wherein the capacitive touch sensor unit includes a flexible printed circuit (FPC), the FPC including a flexible substrate and an electrical circuit trace on the substrate.

13. The device of claim 1 wherein the device is a wireless communication terminal.

14. The device of claim 13 wherein the device is a handheld mobile wireless communication terminal.

15. The device of claim 14 wherein the device is a cellular telephone.

16. The device of claim 1 wherein the opaque coating is configured to represent indicia.

17. The device of claim 16 wherein:
   the indicia includes keypad indicia visually representing a keypad; and
   the capacitive touch sensor unit is configured to receive keypad input from an operator in correspondence with the keypad indicia.

18. The device of claim 16 wherein:
   the indicia includes navigation key indicia visually representing at least one navigation input device; and
   the capacitive touch sensor unit is configured to receive navigation input from an operator in correspondence with the navigation key indicia.

19. A method for forming an electronic device, the method comprising assembling a user input assembly, including:
   mounting a light guide over a front side of a capacitive touch sensor unit;
   selectively applying an opaque coating formed of a light blocking material onto the light guide such that the opaque coating is configured to represent indicia and/or ornamentation; and
   providing a light source to generate light that is transmitted through the light guide to illuminate the user input assembly.

20. The method of claim 19 wherein the step of selectively applying the opaque coating onto the light guide includes painting the opaque coating onto the light guide.

21. The method of claim 19 wherein the step of selectively applying the opaque coating onto the light guide includes printing the opaque coating onto the light guide.

22. The method of claim 19 wherein the step of selectively applying the opaque coating onto the light guide includes vacuum coating the opaque coating onto the light guide.

23. The method of claim 19 wherein the opaque coating is configured to represent indicia.

24. An electronic device comprising a user input assembly, the user input assembly including:
   a capacitive touch sensor unit having a front side;
   a light guide overlying the front side;
   an opaque coating formed of a light blocking material on the light guide, wherein the opaque coating is selectively patterned to present prescribed visual indicia and/or ornamentation; and
   a light source to generate light that is transmitted through the light guide to illuminate the user input assembly.

* * * * *